Patented Feb. 21, 1933

1,898,258

UNITED STATES PATENT OFFICE

MAX OBERLIN, OF DARMSTADT, GERMANY

PROCESS FOR THE PRODUCTION OF PHENYL-AMINOALKYL-CARBINOLS, WHICH ARE SUBSTITUTED IN THE PHENYL NUCLEUS

No Drawing. Application filed September 24, 1930, Serial No. 484,237, and in Germany October 21, 1929.

In my patent-application Ser. No. 469,265, and U. S. Patent, No. 1,865,880, issued July 5, 1932, a process is described for the nitration and reduction of the 1-phenyl-2-methyl-aminopropanol-1, a product which is very sensible towards oxidizing agents.

According to the present invention it has been shown, that quite generally chemical substances of the formula:

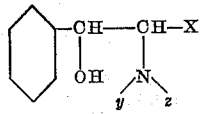

$X$=hydrogen or alkyl, $y$= hydrogen or alkyl, and $z$=hydrogen or alkyl are very resistant towards strong nitric acid or a mixture of nitric and sulfuric acid in such a way, that these agents do not destroy the molecule but substantially result in a nitration of the phenyl-nucleus. This could not be foreseen in view of the fact, that generally they are very sensible towards oxidizing agents. In carrying out the reaction, care must be taken, that the temperature during the nitration does not exceed 10° C. or at the uttermost 30° C. When nitric acid alone is used, it should be an acid of a specific gravity of 1.4. If a mixture of nitric acid and sulfuric acid is used, the first one should be of a specific gravity of 1.4, the second one of a specific gravity of 1.8.

The nitro-compounds which are obtained are reduced to the corresponding amino-compounds, by any reducing operations known per se; e. g. the nitro-comopund in solution may be treated with hydrogen in the presence of palladium or the like; or the reduction may be carried out in the presence of a nickel-catalyst; or stannous chloride and glacial acetic acid may be used.

The so obtained amino-compounds are of important therapeutic value. They are superior to the corresponding compounds, which bear no amino-group in the phenyl-nucleus; the therapeutical properties of the latter being well known, see Kreitmair, Münch. med. Wochenschrift, 1927, 74, 190.

Examples (1.) 20 g. of the 1-phenyl-2-amino-propanol-1 are added to a cooled mixture of 30 ccm. sulfuric acid (sp. g.=1.84) and 30 ccm. nitric acid (sp. g.=1.4); care should be taken, that the temperature does not exceed 10° C. After solution has taken place, the mixture is poured on 50 g. ice. The precipitate is separated by filtration and washed with ice-water. Thereby 17 to 18 grams nitrate are obtained which are dissolved in water. Caustic soda is then added to the aqueous solution and the free base, 1-(para-nitrophenyl)-2-aminopropanol-1, is extracted with ether. About 6 or 7 g. of the base are obtained. It is difficultly soluble in ether. The product is converted into the hydrochloride by the addition of an ether solution of hydrochloric acid to an alcoholic solution of the base. The hydrochloride melts at 235 to 240° C. In aqueous-alcoholic solution this product is reduced by means of catalytic hydrogenation e. g. in presence of palladium oxide. The temperature during the hydrogenation should be between 0° to 60° C. After the hydrogenation has been finished (which may be taken from the fact, that no more hydrogen is absorbed) the solution is evaporated to dryness, the residue is taken up with alcohol; this solution is mixed with ether. Thereby the monohydrochloride of the 1-(para-aminophenyl)-2-amino-propanol-1 is obtained; it is a white crystalline substance which melts with decomposition between 190 to 192° C. By adding alkali to a solution of the mentioned chloride, the free base may be obtained, which is easily soluble in alcohol, less easily soluble in ether and insoluble in petrolether.

(2.) To a mixture of 50 ccm. sulfuric acid (sp. g.=1.84) and 50 ccm. nitric acid (sp. g.=1.4) 50 g. of the nitrate of 1-phenyl-2-amino-propanol-1 are added, whereby care should be taken, that the temperature does not exceed 20° C. After solution has taken place, the mixture is poured on 125 g. ice, whereby a product crystallizes out, after standing about one hour the product is separated by filtration with suction. The yields and properties of the nitro-product correspond to those, mentioned in Example 1. Its further treatment is exactly the same as outlined in Example 1.

(3.) 20 g. of the nitrate of leavo-1-phenyl-2-amino-propanol-1 are added to an ice-cooled mixture of 20 ccm. sulfuric acid (sp. g.=1.84) and 20 ccm. nitric acid (sp. g.=1.4) under the same conditions as outlined in Example 2. After pouring the mixture on ice, an excess of alkali is added and the product is taken up several times with ether. After a part of the ether has been evaporated, the free nitrobase crystallizes out (an amount of about 6 g.), showing a melting point of 138 to 139° C.; it is transformed into the hydrochloride by adding etheric-hydrochloric acid to the alcoholic solution of the base. The hydrogenation of the so obtained product is carried out in aqueous alcoholic solution in presence of palladium. By evaporating the solution in vacuo and subsequent recrystallization from alcohol-ether, the monohydrochloride of leavo - 1 - para-aminophenyl-2-amino-propanol-1 is obtained, showing a melting point of 164 to 166° C. (being decomposed on melting) and showing in 1% aqueous solution of an optical rotation of $[\alpha]_D\ 20° = -33°$.

(4.) 20 g. pseudo 1-phenyl-2-amino propanol-1 are added to an ice-cooled mixture of 30 ccm. sulfuric acid (sp. g.=1.84) and 30 ccm. nitric acid (sp. g.=1.4), whereby care should be taken, that the temperature does not exceed +10° C. After solution has taken place, the mixture is poured on ice and strong alkali is added after some standing. Thereby an oil is separated which is taken up with ether. By taking up the ether with an amount of hydrochloric acid which is smaller than that theoretically required for neutralization, a part is drawn off from the etheric solution which shows a stronger basic character; this product results in a well-crystallized hydrochloride, when treated with hydrochloric acid gas in alcoholic solution. The hydrogenation of the so obtained hydrochloride in the presence of palladium results in pseudo the monohydrochloride of 1-(para-aminophenyl)-2-amino - propanol - 1, which melts at 171 to 173° C. under decomposition.

(5.) 10 g. of the nitrate of phenyl-2-dimethylamino-propanol-1 are added to a cooled mixture of 10 ccm. sulfuric acid (sp. g.=1.84) and 10 ccm. nitric acid (sp. g.=1.4). After solution has taken place, the mixture is poured on ice. After standing sometime alkali is added in such an amount, that the solution shows strong alkaline reaction. The mixture is taken up with ether and after drying the etheric solution, the hydrochloride is precipitated by introducing gaseous hydrochloric acid. 5 to 6 g. are obtained, showing a melting point of 205 to 210° C. The hydrochloride is recrystallized from alcohol-ether. The hydrogenation takes place in the same way, as described in the above mentioned examples and results in the monohydrochloride of 1-(para-aminophenyl)-2-dimethyl-amino-propanol-1, which melts under decomposition at 188 to 190° C.

(6.) 20 g. of the 1-phenyl-2-methylamino-ethanol-1 are added to a cooled mixture of 30 ccm. sulfuric acid (sp. g.=1.84) and 30 ccm. nitric acid (sp. g.=1.4). After solution has taken place, the mixture is poured on ice. During the nitration care should be taken, that the temperature does not exceed 20° C. The aqueous solution is alkalized by adding strong alkali, the precipitate formed thereby is taken up with ether and the hydrochloride of the base, produced by introducing gaseous hydrochloric acid into the etheric solution, separated and recrystallized from alcohol-ether. About 5 g. hydrochloride of a melting point of 162 to 165° C. are obtained.

11.6 g. of the obtained product are dissolved in 500 ccm. alcohol and agitated in an atmosphere of hydrogen in presence of a nickel-catalyst; care should be taken, that the temperature is about 50 to 60° C. After the hydrogenation has come to an end (which may be seen from the fact, that no further hydrogen is taken up) the catalyst is separated, the solution evaporated to dryness and the remainder recrystallized from alcohol-ether. Thereby 8 g. of the monohydrochloride of 1-(para-aminophenyl)-2-methylamino-ethanol-1, melting at 160 to 162° C., are obtained.

(7.) To a solution of 5 g. 1-(para-nitrophenyl)-2-amino-propanol-1 (the nitroproduct has been obtained by nitrating 1-phenyl-2-amino-propanol-1 under the conditions, outlined in the Examples 1 and 2) in 30 ccm. glacial acetic acid a solution of 100 ccm. stannous chloride in glacial acetic acid (containing 30 g. stannous chloride) is added at the temperature of a water-bath. The mixture is kept for 3 hours at this temperature, cooled down and finally filtered in order to separate the formed tin-double-salt; this is decomposed in aqueous solution by means of hydrogen sulfide; the base is precipitated by strongly alkalizing the solution and taking up with ether. By introducing gaseous hydrochloric acid in the (by means of potassium carbonate) dried etheric solution, the dihydrochloride is precipitated. By recrystallizing from alcohol-ether the dihydrochloride of 1-(para-aminophenyl)-2-amino-propanol-1 is obtained in form of shiny, small leaves of a melting point of 192 to 193° C. (under decomposition). Yield 1.5 g.

I claim:

1. Process for the production of products of the general formula:

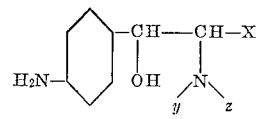

X=hydrogen or methyl, $y$=hydrogen or methyl, and $z=$ hydrogen or methyl, except 1-(para-aminophenyl)-2-methylamino-propanol-1, consisting in the treatment of a salt with a strong acid of the corresponding products without amino-group with nitric acid of a specific gravity of 1.4, care being taken, that the temperature does not exceed 30° C. separating the so formed product by pouring the mixture on ice and separating, finally reducing the nitro-product by one of the well-known methods of reduction.

2. Process for the production of products of the general formula:

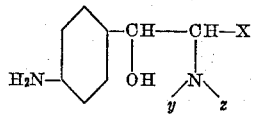

$X=$hydrogen or methyl, $y=$hydrogen or methyl, and $z=$hydrogen or methyl, except 1-(para-aminophenyl)-2-methylamino-propanol-1, consisting in the treatment of a salt with a strong acid of the corresponding products without amino-group with nitric acid of a specific gravity of 1.4, care being taken, that the temperature does not exceed 30° C., separating the so formed product by pouring the mixture on ice and separating the nitro-product and transforming the nitro-product in a suitable solution by catalytic hydrogenation, evaporating to dryness, taking up the product with alcohol, adding ether and separating the precipitated product.

3. As a new and useful compound 1-(para-aminophenyl)-2-amino-propanol-1 soluble in alcohol, more difficultly soluble in ether, insoluble in petrolether, the mono-hydrochloric salt of the new compound consisting of white crystals, showing a melting point of 190 to 192° C. (under decomposition), being very easily soluble in water, difficultly soluble in alcohol and insoluble in ether; the new compound showing the formula:

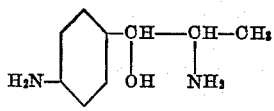

4. Process for the production of 1-(para-aminophenyl)-2-amino-propanol-1 consisting in the treatment of 1-phenyl-2-amino-propanol-1 with nitric acid of a specific gravity 1.4, care being taken that the temperature does not exceed 30° C. separating the so formed nitro-product by pouring the mixture on ice and finally reducing the nitro-product by one of the well known methods for reducing nitro to amino compounds.

5. Process for the production of 1-(para-aminophenyl)-2-amino-aliphatic alcohol of the type represented by the following formula

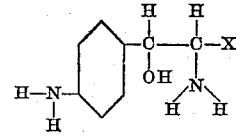

$X=$methyl group or hydrogen consisting in the treatment of the corresponding 1-phenyl-2-amino-alcohol with nitric acid of a specific gravity 1.4 care being taken that the temperature does not exceed 30° C. separating the so formed nitro-product by pouring the mixture on ice and finally reducing the nitro-product by one of the well known methods for reducing nitro to amino compounds.

6. Process for the production of 1-(para-aminophenyl)-2-dimethylamino-propanol-1 consisting in the treatment of 1-phenyl-2-dimethylamino-propanol-1 with nitric acid of a specific gravity 1.4, care being taken that the temperature does not exceed 30° C., separating the so formed nitro-product by pouring the mixture on ice and finally reducing the nitro-product by one of the well known methods for reducing nitro to amino compounds.

MAX OBERLIN.